United States Patent
Jo et al.

(10) Patent No.: US 10,575,213 B2
(45) Date of Patent: Feb. 25, 2020

(54) METHOD FOR PERFORMING A RE-ESTABLISHMENT OF A PDCP ENTITY ASSOCIATED WITH UM RLC ENTITY IN WIRELESS COMMUNICATION SYSTEM AND A DEVICE THEREFOR

(71) Applicant: LG Electronics Inc., Seoul (KR)

(72) Inventors: Geumsan Jo, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/100,791

(22) Filed: Aug. 10, 2018

(65) Prior Publication Data
US 2019/0053098 A1    Feb. 14, 2019

Related U.S. Application Data

(60) Provisional application No. 62/543,395, filed on Aug. 10, 2017.

(51) Int. Cl.
| | |
|---|---|
| *H04W 28/06* | (2009.01) |
| *H04W 76/19* | (2018.01) |
| *H04W 76/27* | (2018.01) |
| *H04W 80/08* | (2009.01) |
| *H04W 88/16* | (2009.01) |
| *H04W 80/02* | (2009.01) |

(52) U.S. Cl.
CPC .......... *H04W 28/06* (2013.01); *H04W 76/19* (2018.02); *H04W 76/27* (2018.02); *H04W 80/08* (2013.01); *H04W 88/16* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 2010/0135303 A1* | 6/2010 | Umesh | H04L 1/1812 370/394 |
| 2013/0148490 A1 | 6/2013 | Yi et al. | |

(Continued)

FOREIGN PATENT DOCUMENTS

| | | | | |
|---|---|---|---|---|
| KR | 20150137064 A | * | 12/2015 | ........ H04W 36/0072 |
| KR | 20160104038 A | * | 9/2016 | ............ H04W 76/00 |

OTHER PUBLICATIONS

LG Electronics Inc., "E-mail discussion summary of PDCP receive operation," 'R2-1706869' 3GPP TSG-RAN WG2 NR AdHoc, Qingdao, China, Jun. 27-Jun. 29, 2017, 29 pages.

(Continued)

*Primary Examiner* — Rebecca E Song
(74) *Attorney, Agent, or Firm* — Fish & Richardson P.C.

(57) ABSTRACT

The present invention relates to a wireless communication system. More specifically, the present invention relates to a method and a device for performing a re-establishment of PDCP entity associated with UM RLC entity in wireless communication system, the method comprising: when a re-establishment of a Packet Data Convergence Protocol (PDCP) entity is triggered, stopping and resetting, by the PDCP entity, a reordering timer of the PDCP entity if the reordering timer of the PDCP entity is running; and delivering, by the PDCP entity, all stored PDCP Service Data Unit (SDU) to upper layers in ascending order of associated COUNT values.

20 Claims, 11 Drawing Sheets

(56) References Cited

U.S. PATENT DOCUMENTS

| | | | |
|---|---|---|---|
| 2016/0044639 A1* | 2/2016 | Yi | H04L 47/624 |
| | | | 370/329 |
| 2016/0183221 A1* | 6/2016 | Yi | H04L 1/1887 |
| | | | 370/329 |
| 2016/0315868 A1* | 10/2016 | Zhang | H04L 47/34 |
| 2017/0041767 A1 | 2/2017 | Vajapeyam et al. | |
| 2017/0201603 A1 | 7/2017 | Uchino et al. | |
| 2018/0083688 A1* | 3/2018 | Agiwal | H04M 3/537 |

OTHER PUBLICATIONS

International Search Report and Written Opinion in International Application No. PCT/KR2018/008640, dated Nov. 16, 2018, 12 pages.

* cited by examiner (a) Control-Plane Protocol Stack (b) User-Plane Protocol Stack (a) Control-Plane Protocol Stack (b) User-Plane Protocol Stack A : RRC reconfiguration, successful

B : RRC reconfiguration, failure

METHOD FOR PERFORMING A RE-ESTABLISHMENT OF A PDCP ENTITY ASSOCIATED WITH UM RLC ENTITY IN WIRELESS COMMUNICATION SYSTEM AND A DEVICE THEREFOR

This application claims the benefit of the U.S. Patent Application No. 62/543,395 filed on Aug. 10, 2017 which is hereby incorporated by reference as if fully set forth herein.

BACKGROUND OF THE INVENTION

Field of the Invention

The present invention relates to a wireless communication system and, more particularly, to a method for performing a re-establishment of a PDCP entity associated with UM RLC entity in wireless communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARM)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described in the context of a long term evolution (LTE) system and a LTE-advanced (LTE-A) system in the present specification, they are purely exemplary. Therefore, the embodiments of the present invention are applicable to any other communication system corresponding to the above definition. An exemplary system in which the invention disclosed herein may be implemented is a system compliant with the 3GPP specification TS 36.321 Version 12.6.0. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
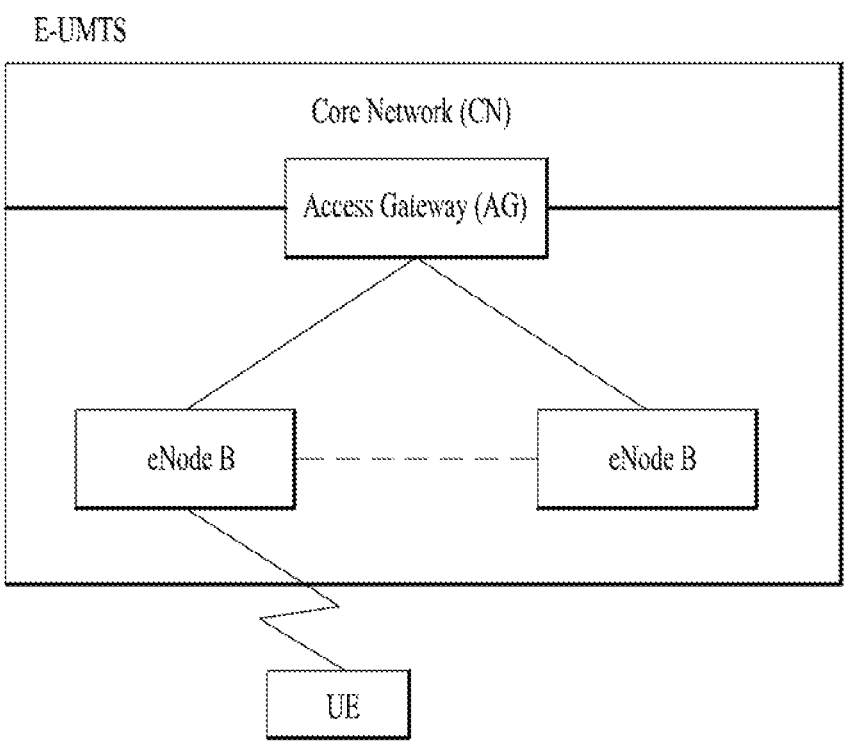
FIG. 1 is a diagram showing a network structure of an Evolved Universal Mobile Telecommunications System (E-UMTS) as an example of a wireless communication system.
Figure 2A:
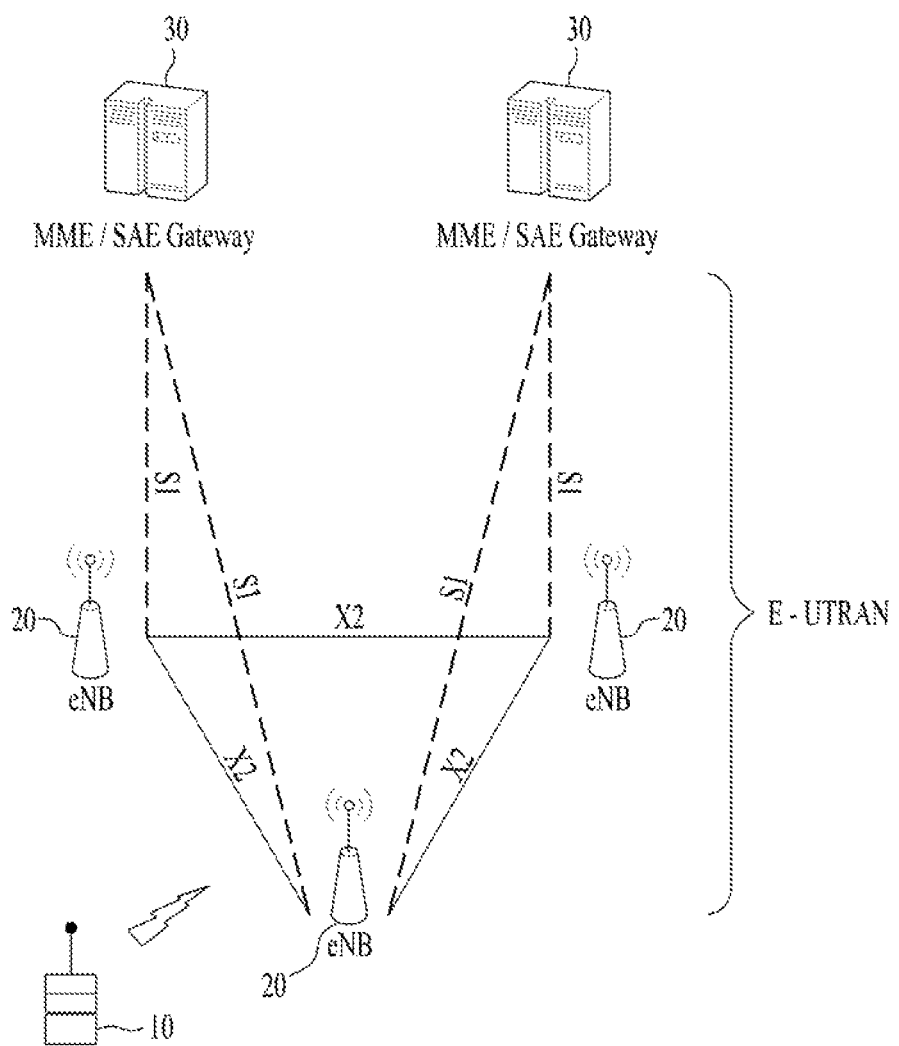
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
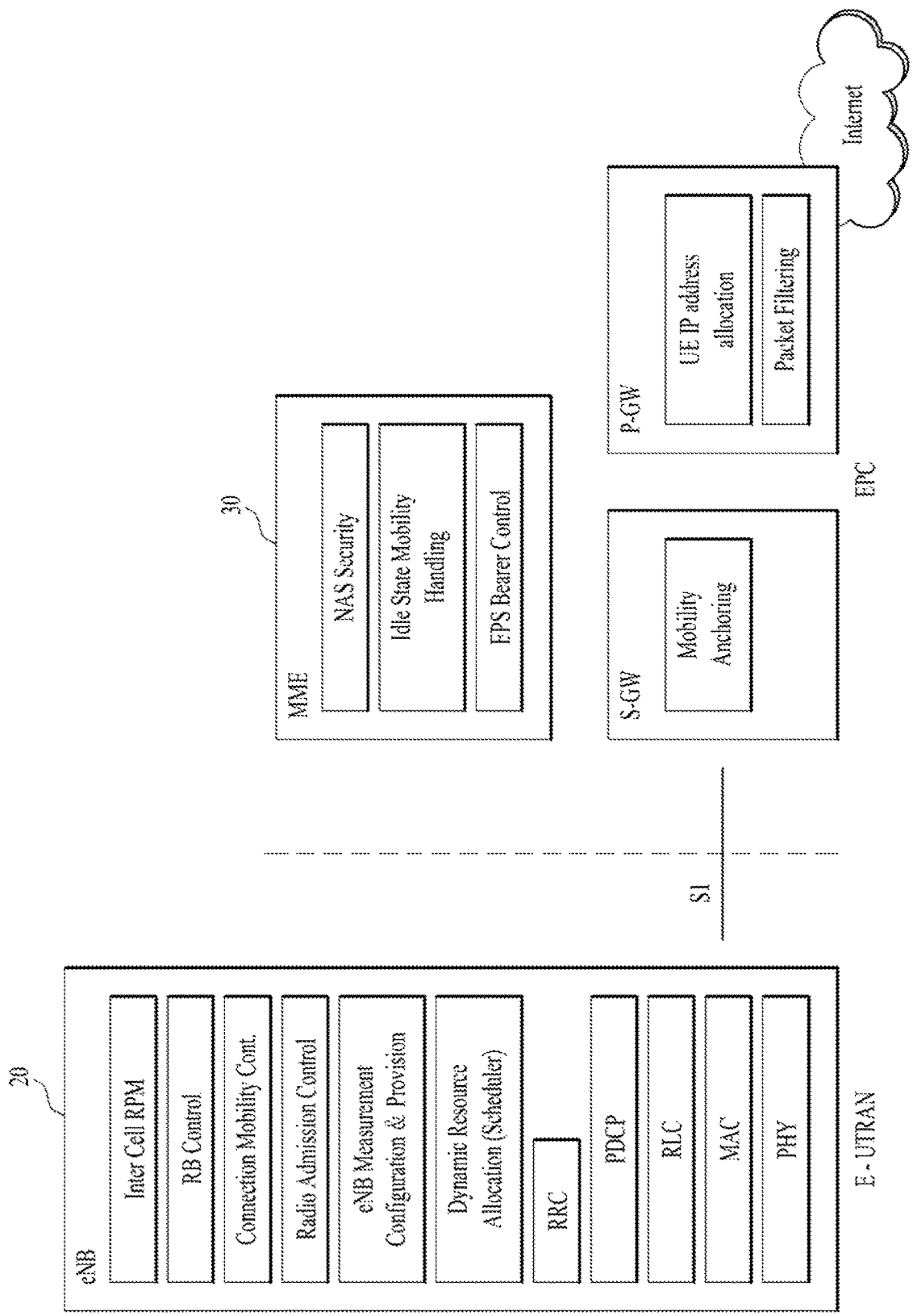
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
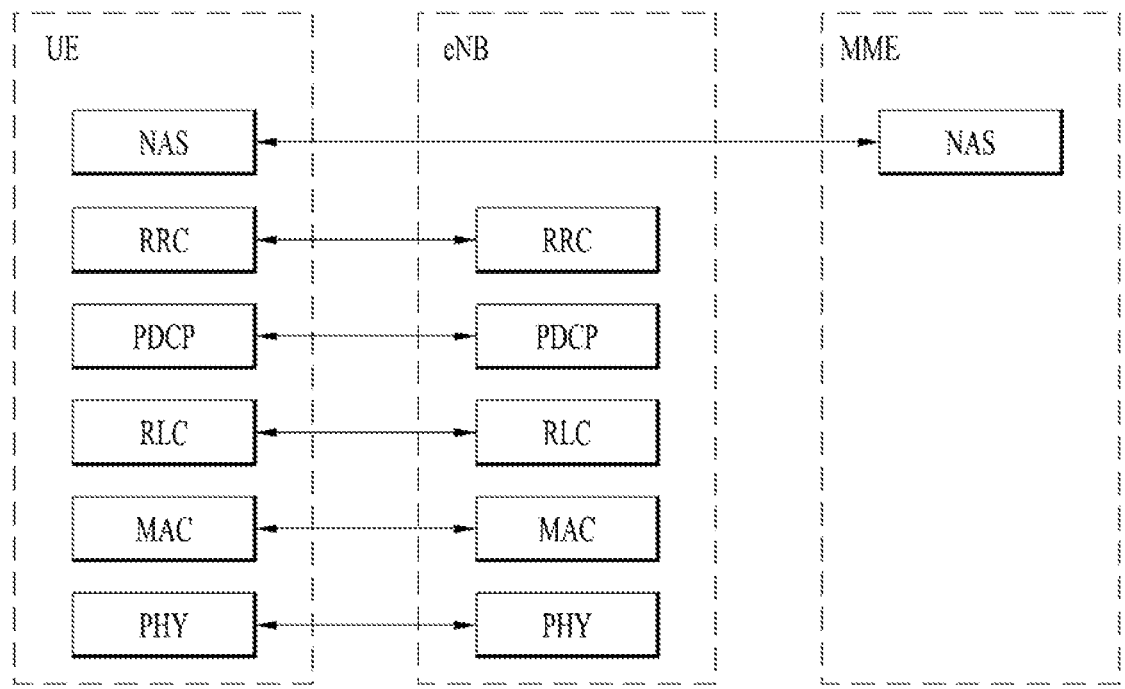
FIG. 3 is a diagram showing a control plane and a user plane of a radio interface protocol between a UE and an E-UTRAN based on a 3rd generation partnership project (3GPP) radio access network standard.
Figure 3:
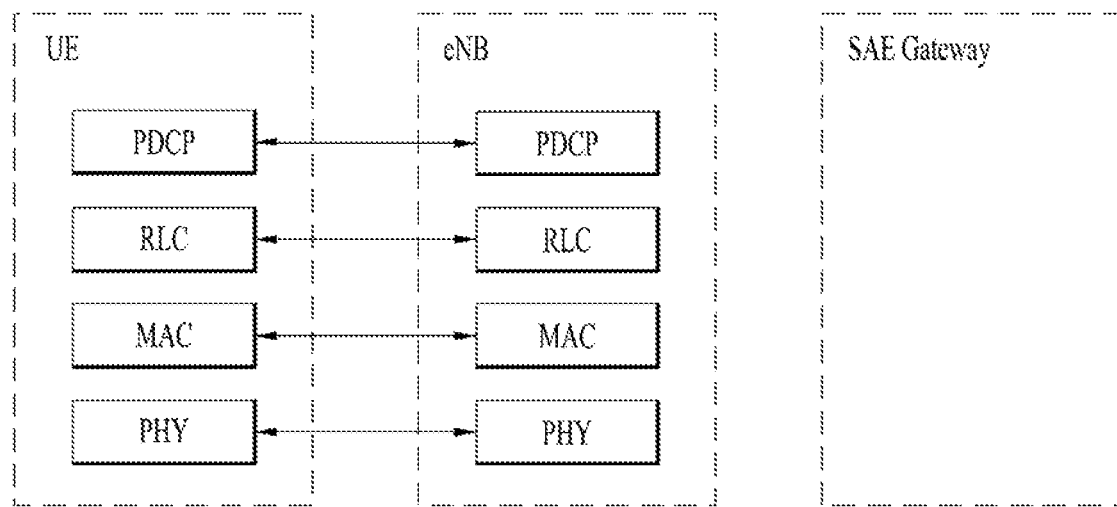

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
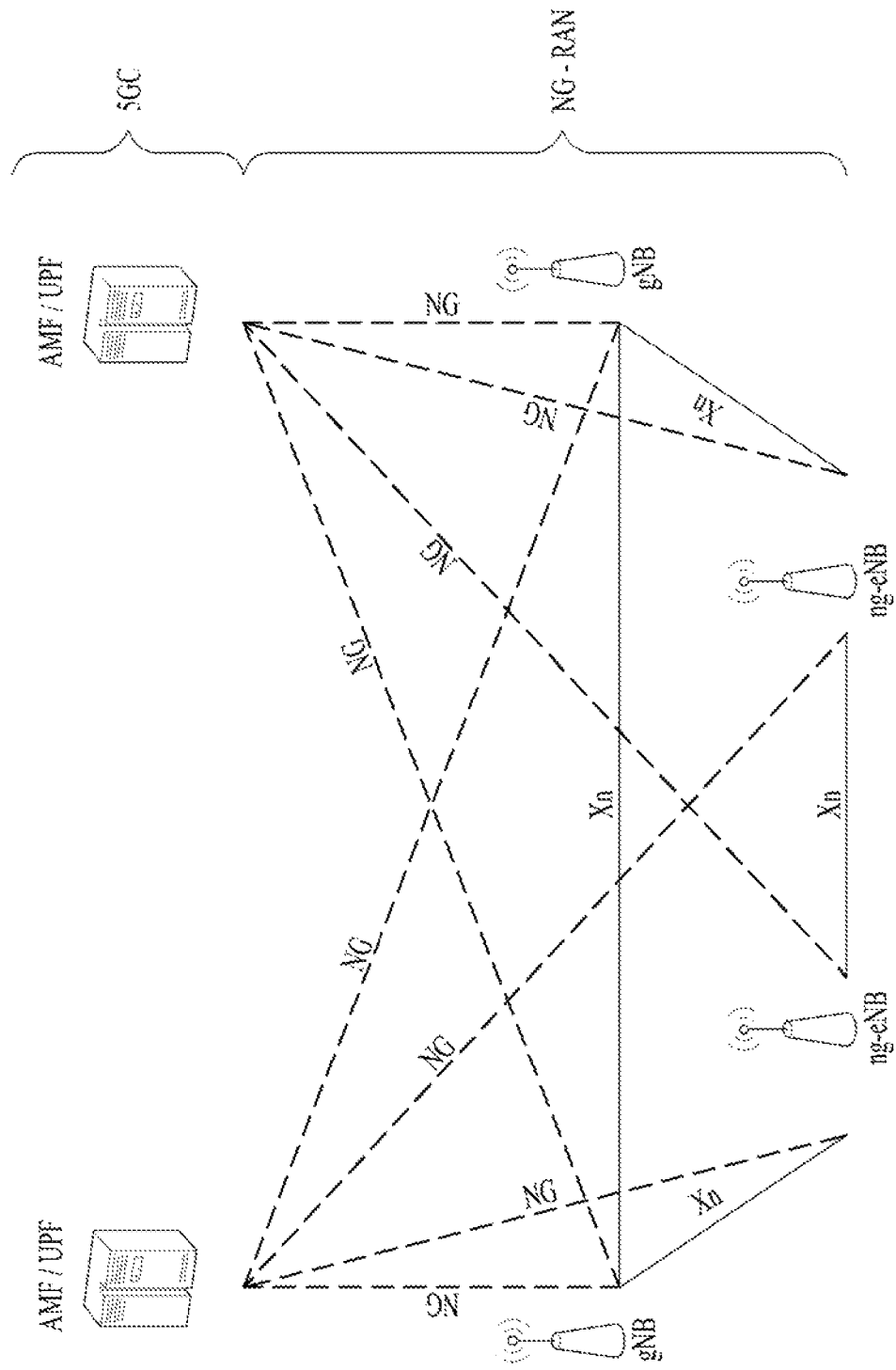
FIG. 4A is a block diagram illustrating network structure of NG Radio Access Network (NG-RAN) architecture.
Figure 4B:
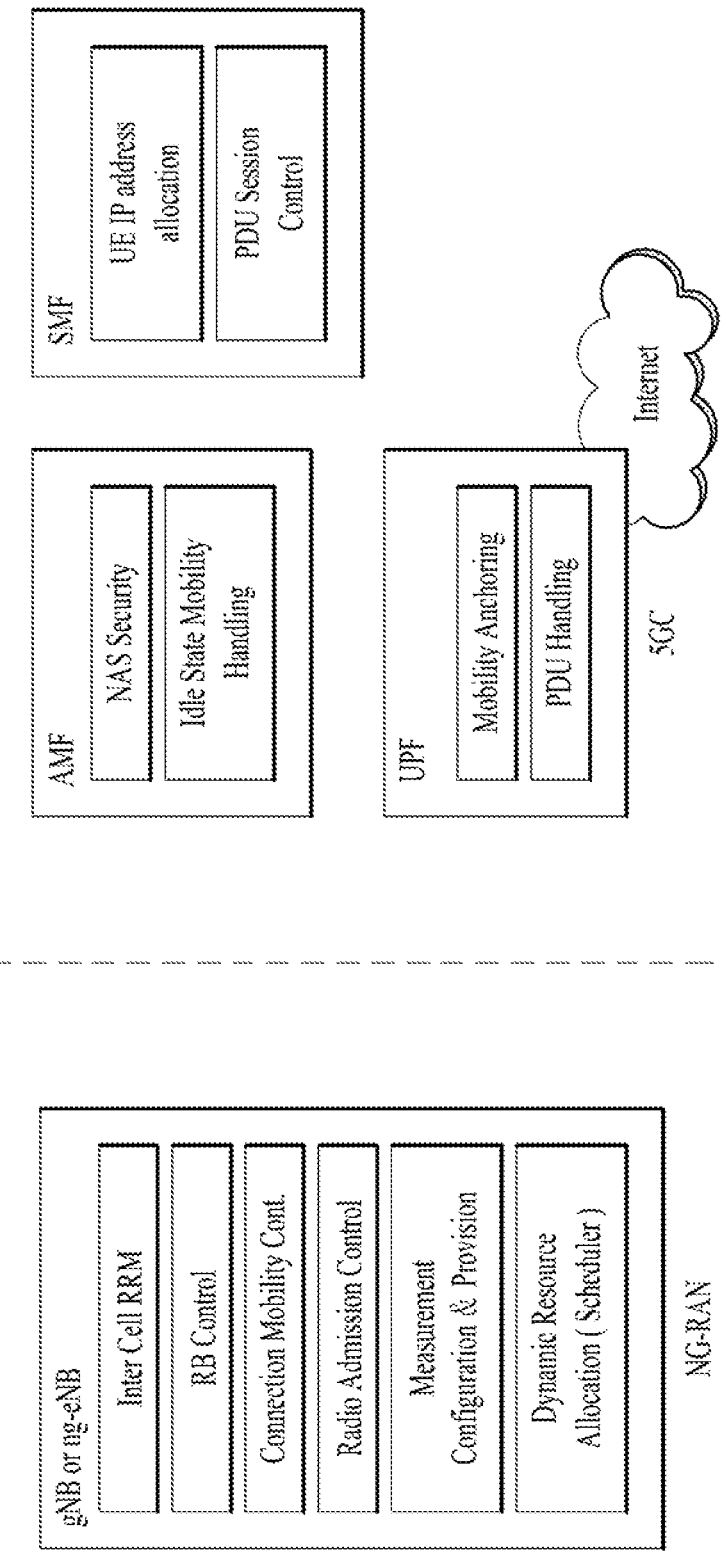
FIG. 4B is a block diagram depicting architecture of functional Split between NG-RAN and 5G Core Network (5GC).

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signaling protocol is referred to as XnAP (Xn Application Protocol). The SCTP layer provides the guaranteed delivery of application layer messages. In the transport IP layer point-to-point transmission is used to deliver the signaling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signaling messages, SCTP is added on top of IP. The application layer signaling protocol is referred to as NGAP (NG Application Protocol). The SCTP layer provides guaranteed delivery of application layer messages. In the transport, IP layer point-to-point transmission is used to deliver the signaling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi)

Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signaling termination, ii) NAS signaling security, iii) AS Security control, iv) Inter CN node signaling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
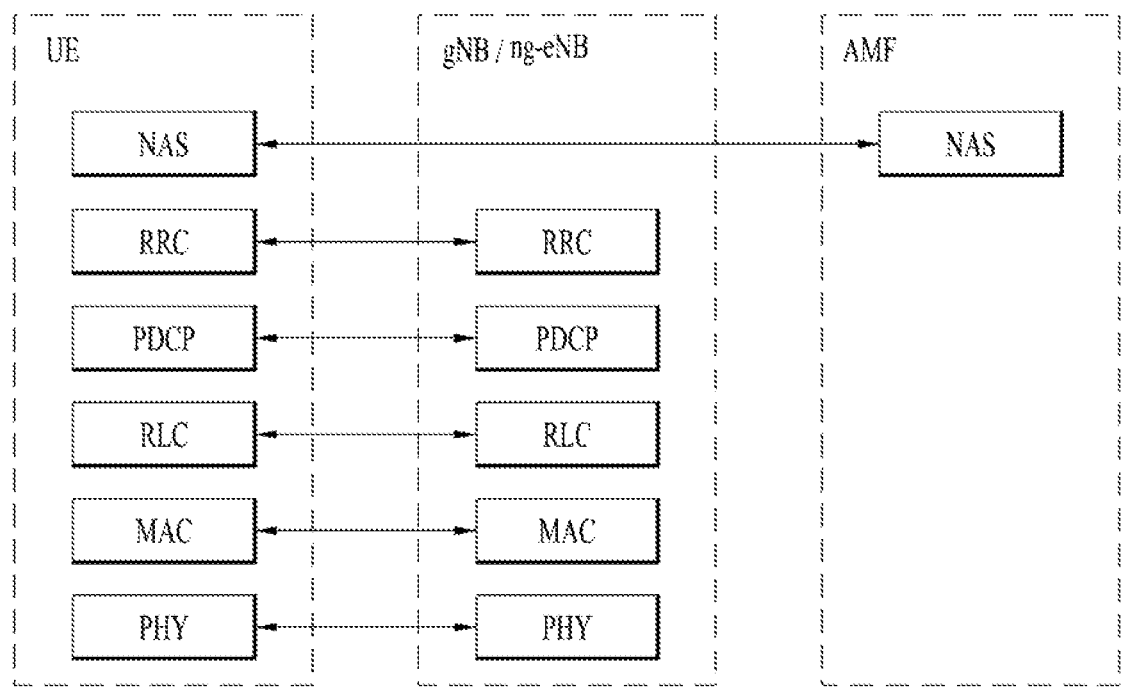
FIG. 5 is a diagram showing a control plane and a user plane of a radio interface protocol between a UE and a NG-RAN based on a 3rd generation partnership project (3GPP) radio access network standard.
Figure 5:
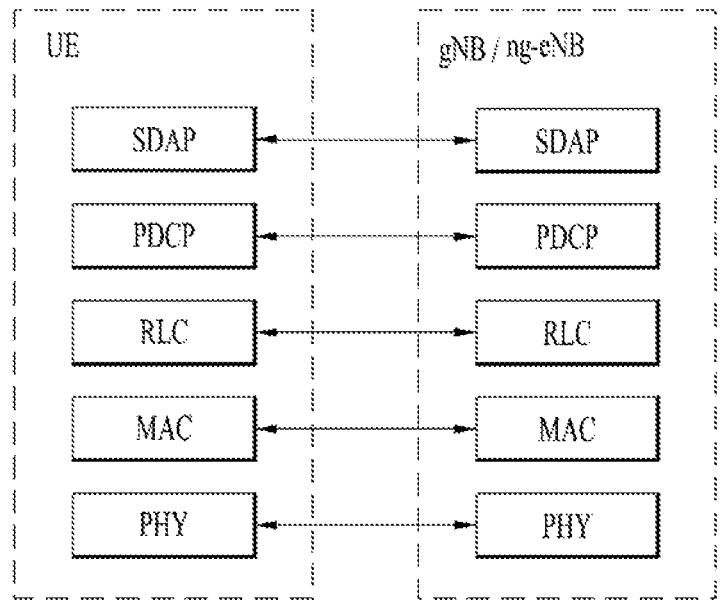

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
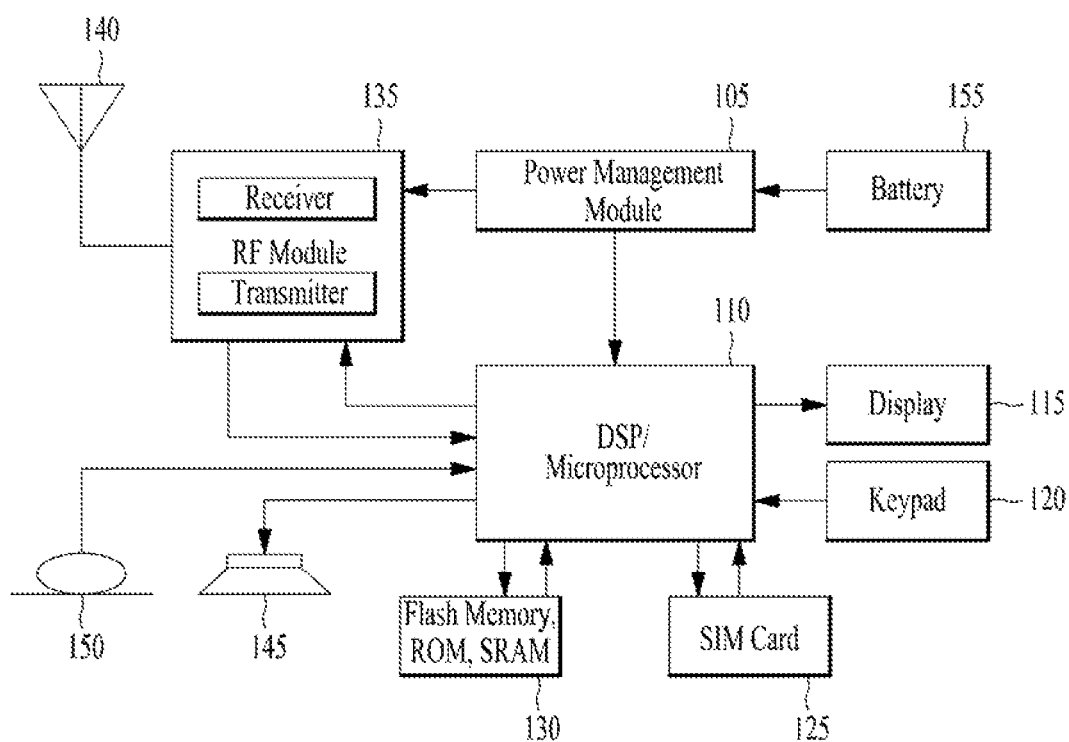
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 7:
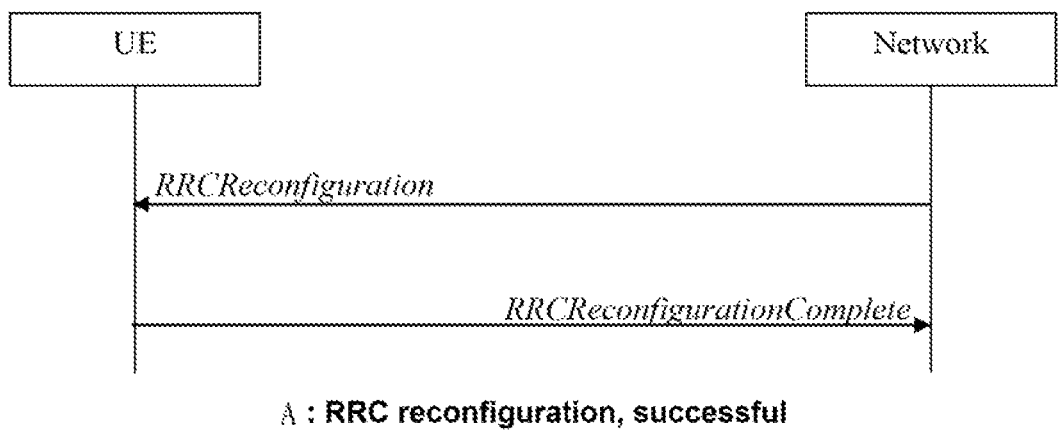
FIG. 7 is a diagram for RRC reconfiguration message involving a PDCP re-establishment.
Figure 7:
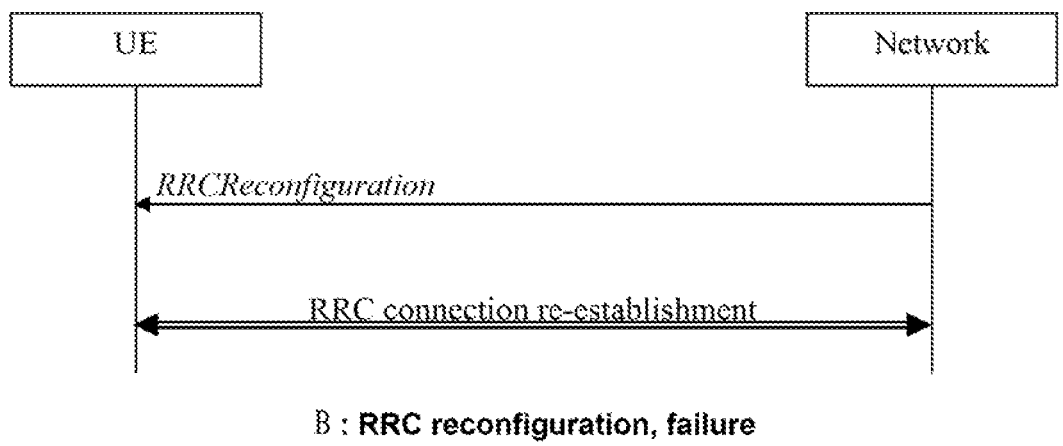

FIG. 7 is a diagram for RRC reconfiguration message involving a PDCP re-establishment.

When the UE receives RRC reconfiguration message of RadioBearerConfig including the srb-ToAddModList, the UE performs the SRB addition or reconfiguration. For each srb-Identity value included in the srb-ToAddModList that is part of the current UE configuration, if reestablishPDCP is set, the UE re-establishes the PDCP entity of this SRB.

When the UE receives RRC reconfiguration message of RadioBearerConfig including the drb-ToAddModList, the UE performs the DRB addition or reconfiguration. For each drb-Identity value included in the drb-ToAddModList that is part of the current UE configuration, if reestablishPDCP is set, the UE re-establishes the PDCP entity of this DRB.

In LTE, a PDCP entity is supported in-sequence delivery of upper layer PDUs at PDCP re-establishment procedure for RLC AM. For split bearers in DC (only support for RLC AM) and LWA bearers (only support for RLC AM and RLC UM), PDCP PDU routing for transmission and PDCP PDU reordering for reception are supported. Since the PDCP reordering function is not performed by default in the LTE, the PDCP reestablishment depends on whether the reordering function is configured in the PDCP entity.

For detail, when upper layers request a PDCP re-establishment while a PDCP entity is configured for a DRB mapped on RLC AM and the reordering function is not used, the PDCP entity processes the PDCP Data PDUs that are received from lower layers due to the re-establishment of the lower layers, resets the header compression protocol for downlink and starts with NC state in U-mode (if configured), except if upper layers indicate stored UE AS context is used and drb-ContinueROHC is configured. And the PDCP entity sets Next_PDCP_RX_SN, RX_HFN to 0 and Last_submitted_PDCP_RX_SN to Maximum_PDCP_SN, and applies the ciphering algorithm and key provided by upper layers during the re-establishment procedure.

On the other hand, when upper layers request a PDCP re-establishment while the PDCP entity is configured for a DRB mapped on RLC AM and the reordering function is used, the PDCP entity processes the PDCP Data PDU(s) that are received from lower layers due to the re-establishment of the lower layers, stops and resets t-Reordering if the PDCP entity is to be associated with one AM RLC entity after PDCP re-establishment, and apples the ciphering algorithm and key provided by upper layers during the re-establishment procedure.

When upper layers request a PDCP re-establishment while the PDCP entity is configured for a DRB mapped on RLC UM, the PDCP entity processes the PDCP Data PDUs that are received from lower layers due to the re-establishment of the lower layers), resets the header compression protocol for downlink and starts with NC state in U-mode if the DRB is configured with the header compression protocol and drb-ContinueROHC is not configured. And the PDCP entity sets Next_PDCP_RX_SN, and RX_HFN to 0, applies the ciphering algorithm and key provided by upper layers during the re-establishment procedure.

Here, 'Next_PDCP_RX_SN' is a state variable indicating a PDCP SN of a next PDCP SDU for a given PDCP entity. At establishment of the PDCP entity, the UE shall set Next_PDCP_TX_SN to 0. 'RX_HFN' is a state variable indicating a HFN value for the generation of the COUNT value used for the received PDCP PDUs for a given PDCP entity. At establishment of the PDCP entity, the UE shall set RX_HFN to 0. 'Last_submitted_PDCP_RX_SN' is state variable indicating a SN of the last PDCP SDU delivered to the upper layers. At establishment of the PDCP entity, the UE shall set Last_Submitted_PDCP_RX_SN to Maximum_PDCP_SN. The Maximum_PDCP_SN is Table 1.

TABLE 1

| # of PDCP SN | A length of SN |
| --- | --- |
| 262143 | if the PDCP entity is configured for the use of 18 bits SNs |
| 65535 | if the PDCP entity is configured for the use of 16 bits SNs |
| 32767 | if the PDCP entity is configured for the use of 15 bits SNs |
| 4095 | if the PDCP entity is configured for the use of 12 bit SNs |
| 127 | if the PDCP entity is configured for the use of 7 bit SNs |
| 31 | if the PDCP entity is configured for the use of 5 bit SNs |

Meanwhile, in NR, the PDCP entity performs reordering function by default. When upper layers request a PDCP entity re-establishment, the receiving PDCP entity i) discards all stored PDCP SDUs and PDCP PDUs for SRBs, ii) resets the header compression protocol for downlink and start with NC state in U-mode if drb-ContinueROHC is not configured for UM DRB, iii) sets RX_NEXT and RX_DELIV to the initial value for UM DRBs and SRBs, iv) applies the ciphering algorithm and key provided by upper layers during the PDCP entity re-establishment procedure, and v) applies the integrity protection algorithm and key provided by upper layers during the PDCP entity re-establishment procedure.

Here, 'RX_NEXT' is a state variable indicating the COUNT value of the next PDCP SDU expected to be received. The initial value is 0. And "RX_DELIV' is state variable indicates the COUNT value of the first PDCP SDU not delivered to the upper layers, but still waited for. The initial value is 0.

As mentioned above, the state variables and COUNT values are reset when the PDCP re-establishment is performed implies that the reordering function performed in the PDCP entity is also changed.

For AM DRBs, when a PDCP re-establishment is triggered, if there may be some PDCP SDUs stored in the reordering buffer, the PDCP can keep the PDCP SDUs the reordering buffer even after the PDCP re-establishment. Since state variables and COUNT values are maintained during the PDCP re-establishment, keeping the PDCP SDUs in the reordering buffer is no problem. The PDCP SDUs received after the PDCP re-establishment can be reordered with PDCP SDUs received before the PDCP re-establishment.

However, for UM DRBs, state variables and COUNT values are reset during the PDCP re-establishment, and PDCP SDUs received after the PDCP re-establishment cannot be reordered with the PDCP SDUs received before the PDCP re-establishment.

The state variables and COUNT values are reset when the PDCP re-establishment is performed implies that the reordering function performed in the PDCP entity is also changed.

In LTE, the reordering function was performed only in a split bearer and the split bearer is only supported in the AM RLC, so there was no impact on the reordering function even if PDCP re-establishment.

Meanwhile, in eLTE, even though a LWA bearer adopts a split bearer structure, the LWA bearer is supported not only in the AM RLC but also UM RLC, and some split bearers are supported in UM RLC as well as in AM RLC. Further in NR, a PDCP entity associated with UM RLC as well as a PDCP entity associated with AM RLC performs the reordering function by default regardless of the split bearer.

According to the current specification, there is no definition of how to handle the SDUs stored in the reordering buffer or reordering buffer, even though initialization of the state variable occurs in the PDCP re-establishment in case of UM DRB.

In this cases, the receiving PDCP thinks that two options. One is discarding stored PDCP SDUs (option 1). The other is delivering stored PDCP SDUs to upper layer (option 2). Both options are possible, but it is a problem if one UE takes option 1 and another UE takes option 2. Thus, how to handle the stored PDCP SDUs at PDCP re-establishment needs to be discussed for UM DRBs.

Figure 8:
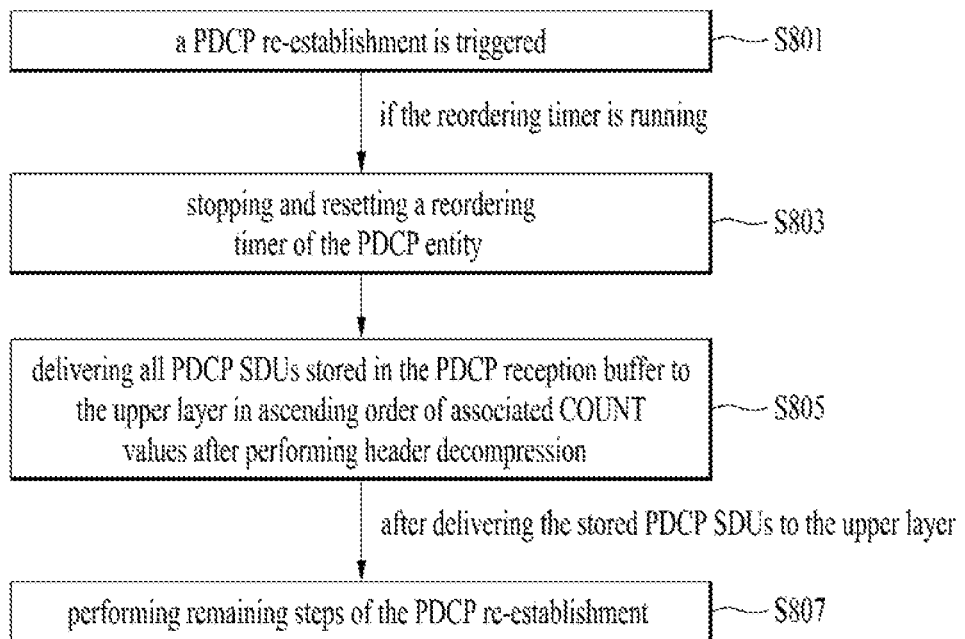
FIG. 8 is a conceptual diagram for performing a re-establishment of PDCP entity associated with UM RLC entity in wireless communication system according to embodiments of the present invention.

FIG. 8 is a conceptual diagram for performing a re-establishment of PDCP entity associated with UM RLC entity in wireless communication system according to embodiments of the present invention.

It is invented that to the receiving PDCP entity delivers all stored PDCP SDUs to upper layers when performing the PDCP re-establishment procedure. When a PDCP entity performs PDCP re-establishment, delivering the stored SDUs to the upper layer rather than discarding it is slightly better in that the delivered PDCP SDUs may be utilized by upper layer.

For details, when a re-establishment of a Packet Data Convergence Protocol (PDCP) entity is triggered (S801), the receiving PDCP entity stops and resets a reordering timer of the PDCP entity if the reordering timer of the PDCP entity is running (S803).

Preferably, the triggering of the PDCP entity re-establishment occurs when upper layers request a PDCP entity re-establishment, and so on.

Preferably, the reordering timer is started when an out-of-order PDCP SDU is received from a lower layer in a reordering window associated with the reordering timer.

Here, the reordering timer is a timer that operates during a reordering function of the PDCP entity. The reordering timer starts when an out-of-order SDU is received from the lower layer, and out-of-order SDUs are stored in a reordering buffer while the reordering timer is running. The reordering timer expires, and the stored out-of-order SDUs are delivered to the upper layer in sequentially.

The term of 'in sequentially' means in ascending order of COUNT values associated with PDCP SDUs in the reordering buffer.

The out-of-order SDU is a SDU other than a next SDU expected to be received from a lower layer. Since PDUs other than the reordering window are discarded as soon as they are received, in this case, it is limited that the PDU other than a next PDU expected to be received is received in the reordering window.

The PDCP entity manages 'RX_NEXT', 'RX_DELIV', and 'RX_REORD' for the reordering function.

'RX_NEXT' is a state variable indicating a COUNT value of the next PDCP SDU expected to be received. Since 'RX_NEXT' indicates the next COUNT value expected by the receiving PDCP entity, it is possible to know whether it is an out-of-order SDU by using RX_NEXT value. That is, if a PDU (or SDU) having a COUNT value equal to RX_NEXT is received from the lower layer, the PDU (or SDU) is an in-order PDU (or SDU). If a PDU (or SDU) having a COUNT value larger than RX_NEXT is received from the lower layer, the PDU (or SDU) is an out-of-order PDU (or SDU).

Actually, 'RX_NEXT' is defined using term of 'SDU'. Since the receiving PDCP entity receives a 'PDU' from the lower layer and process and transmits a SDU' corresponding to the 'PDU' to the upper layer, the term of 'SDU' may be used interchangeably with the term of 'PDU' in the reordering function.

'RX_DELIV' is a state variable indicating a COUNT value of a first PDCP SDU not delivered to the upper layers, but still waited for. According to current specification, only when a PDU with a same COUNT as 'RX_DELIV' is received or when the t-reordering timer is expired, the reordering window is shifted while 'RX_DELIV' is updated. By definition, 'RX_DELIV' means the lowest COUNT value among COUNT values of the SDUs not transmitted to the upper layer, so 'RX_DELIV' indicates the lower edge of the reordering window. The reordering window size is a constant, and the reordering window is maintained until the PDU with a same COUNT as 'RX_DELIV' is received or the t-reordering timer is expired, because the 'RX_DELIV' is not changed.

'RX_REORD' is a state variable indicating a COUNT value following the COUNT value associated with the PDCP Data PDU which triggered reordering timer.

The reordering timer is triggered when an out-of-order PDU is received from the lower layer. So 'RX_REORD' is updated to a COUNT value following a COUNT value associated with the out-of-order PDCP PDU.

The state variable described above is a term used in NR, and LTE uses a different variable. The term is different, but the reordering function is performed identically.

In LTE terminology, 'RX_DELIV' corresponds to 'Last_Submitted_PDCP_RX_SN', 'RX_REORD' corresponds to 'Reordering_PDCP_RX_COUNT', and 'RX_NEXT' corresponds to 'Next_PDCP_RX_SN'.

The difference between LTE and NR is that the PDCP entity manages the sequence number (SN) of SDU. However, it is the same as NR to derive COUNT by adding HFN to SN. Further, LTE does not support Out-of-order delivery in a PDCP entity, 'Last_Submitted_PDCP_RX_SN' indicates the SN of the last PDCP SDU delivered to the upper layers at establishment of the PDCP entity. That is, 'Last_Submitted_PDCP_RX_SN' means a largest SN value among SNs of SDUs successfully transmitted in the reordering buffer, so 'Last_Submitted_PDCP_RX_SN'+1 is the lower edge value of the reordering window.

And the PDCP entity delivers all PDCP SDUs stored in the PDCP reordering buffer to the upper layer in ascending order of associated COUNT values after performing header decompression (S805).

"Associated COUNT values" means COUNT values associated with SDUs stored in the reordering buffer. For example, if SDUs with COUNT 22, 24, and 25 are stored in the reordering buffer, then COUNT 22, 24, and 25 are associated COUNT values, and a SDU with COUNT 22 is delivered first, followed by a SDU with COUNT 24. Finally, a SDU with COUNT 25 is delivered to the upper layer sequentially.

After delivering the stored PDCP SDUs to the upper layer, the receiving PDCP entity performs remaining steps of re-establishment (S807).

For detail, the receiving PDCP entity resets the header compression protocol for downlink and starts with NC state in U-mode if drb-ContinueROHC is not configured, sets the RX_NEXT and RX_DELIV to initial value, applies the ciphering algorithm and key provided by upper layers during the PDCP entity re-establishment procedure, and applies the integrity protection algorithm and key provided by upper layers during the PDCP entity re-establishment procedure.

Preferably, the invention applies to the receiving PDCP entity operating on RLC UM, i.e. UM DRB.

Figure 9:
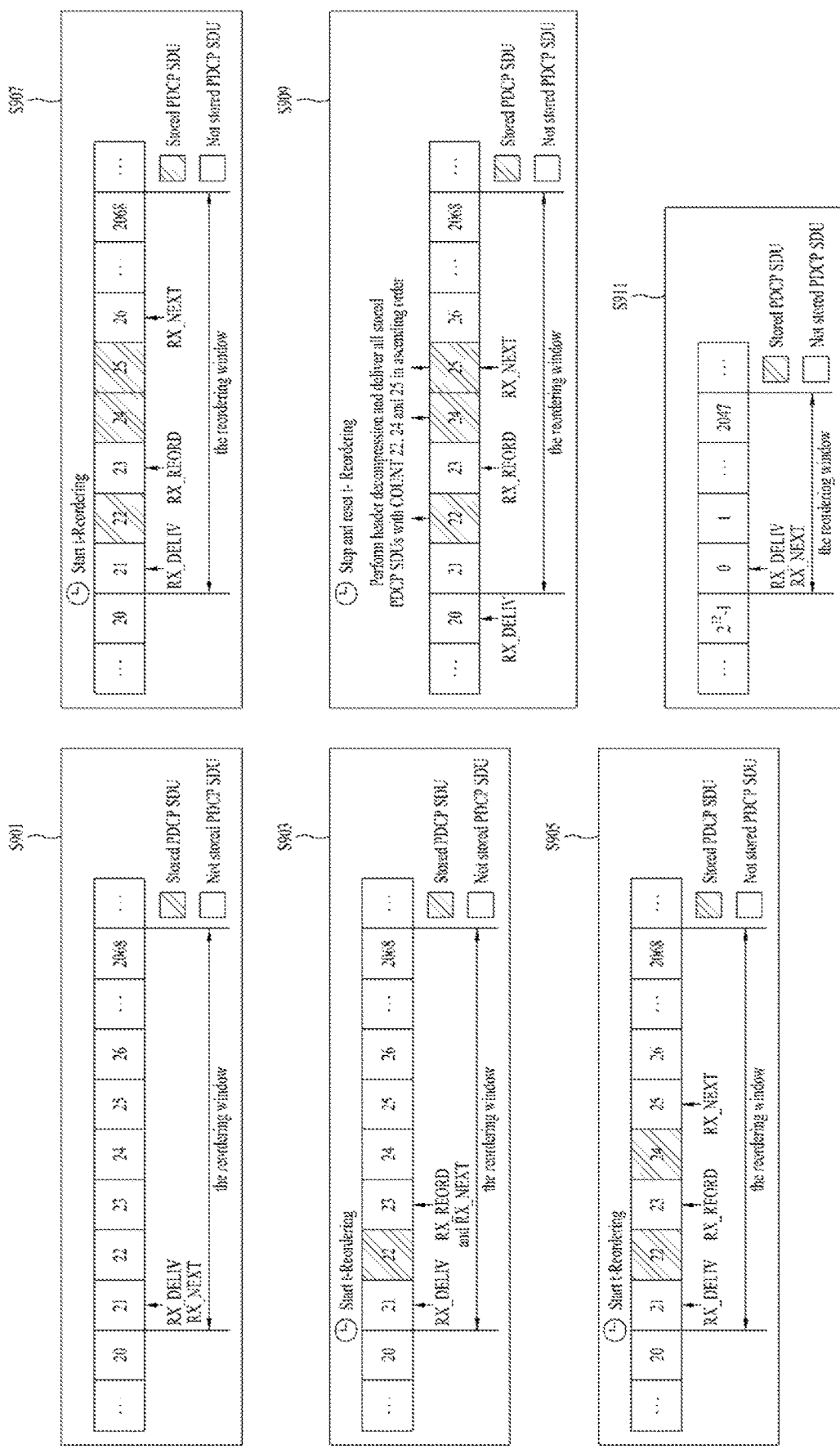
FIG. 9 is an example for performing a re-establishment of PDCP entity associated with UM RLC entity in wireless communication system according to embodiments of the present invention.

FIG. 9 is an example for performing a re-establishment of PDCP entity associated with UM RLC entity in wireless communication system according to embodiments of the present invention.

Assume that the receiving PDCP entity respectively updated RX_DELIV and RX_NEXT to 21 and t-Reordering is not running (S901).

When the PDCP SDU with the COUNT 22 is received from lower layer, the receiving PDCP entity starts t-Reordering and updates RX_REORD and RX_NEXT to 23. And the receiving PDCP entity doesn't update RX_DELIV, and stores the PDCP SDU with the COUNT 24 (S903).

While the t-Reordering is running, the PDCP SDU with the COUNT 24 is received from lower layer. The receiving PDCP entity updates RX_NEXT to 25. The receiving PDCP entity doesn't update RX_DELIV and RX_REORD. And the receiving PDCP entity stores the PDCP SDU with the COUNT 24 (S905).

While the t-Reordering is running, the PDCP SDU with the COUNT 25 is received from lower layer. The receiving PDCP entity updates RX_NEXT to 26. The receiving PDCP entity doesn't update RX_DELIV and RX_REORD. And the receiving PDCP entity stores the PDCP SDU with the COUNT 25 (S907).

When upper layer request a PDCP entity re-establishment, the receiving PDCP entity stops and resets t-Reordering, and delivers all stored PDCP SDUs in ascending order of associated COUNT value after performing header decompression (S909).

The receiving PDCP entity resets the header compression protocol for downlink and start with NC state in U-mode if drb-ContinueROHC is not configured. The receiving PDCP entity sets RX_DELIV and RX_NEXT to initial value. The receiving PDCP entity applies the ciphering algorithm and key provided by upper layers, and applies the integrity protection algorithm and key provided by upper layers (S911).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

While the above-described method has been described centering on an example applied to the 3GPP LTE and NR system, the present invention is applicable to a variety of wireless communication systems in addition to the 3GPP LTE and NR system.

What is claimed is:

1. A method performed by a receiving device operating in a wireless communication system, the method comprising:
   determining that a Packet Data Convergence Protocol (PDCP) re-establishment has been triggered for re-establishment of a PDCP entity of the receiving device, wherein the PDCP entity is associated with an Unacknowledged mode (UM) Radio Link Control (RLC) entity of the receiving device; and
   based on the PDCP re-establishment being triggered:
      stopping and resetting a reordering timer that is associated with delivering PDCP Service Data Units (SDUs) to an upper layer of the receiving device;
      delivering all stored PDCP SDUs to the upper layer in ascending order of COUNT values that are associated with the PDCP SDUs; and
      setting, by the PDCP entity, an RX_DELIV state variable and an RX_NEXT state variable of the PDCP entity to initial values, wherein the RX_DELIV state variable and the RX_NEXT state variable are receive state variables for the PDCP entity,
   wherein the RX_DELIV state variable is used to indicate a lower edge of a reordering window such that a first PDCP SDU not delivered to the upper layer can be identified, and
   wherein the RX_NEXT state variable is used to indicate a next PDCP SDU expected to be received.

2. The method according to claim 1, wherein setting, by the PDCP entity, the RX_DELIV state variable and the RX_NEXT state variable to the initial values comprises setting the RX_DELIV state variable and the RX_NEXT state variable to values of 0.

3. The method according to claim 2, further comprising:
   setting, by the PDCP entity, the RX_DELIV state variable and the RX_NEXT state variable to the initial values during the PDCP re-establishment.

4. The method according to claim 2, further comprising:
   starting the reordering timer based on the PDCP entity receiving, from a lower layer of the receiving device, a PDCP Protocol Data Unit (PDU) with a COUNT value-higher than a value of the RX_NEXT state variable.

5. The method according to claim 1, wherein delivering the all stored PDCP SDUs to the upper layer comprises:
   delivering the all stored PDCP SDUs to the upper layer after performing PDCP header decompression.

6. The method according to claim 1, wherein determining that the PDCP re-establishment has been triggered comprises:
   receiving, from the upper layer of the receiving device, a request for the PDCP re-establishment.

7. The method according to claim 1, wherein stopping and resetting the reordering timer comprises:
   stopping and resetting the reordering timer in a state in which the reordering timer is running.

8. The method according to claim 1, wherein delivering the all stored PDCP SDUs to the upper layer comprises:
   delivering the all stored PDCP SDUs to the upper layer based on stopping and resetting the reordering timer.

9. The method according to claim 1, wherein delivering the all stored PDCP SDUs to the upper layer comprises:
   delivering, to the upper layer, all PDCP SDUs that were received by the PDCP entity from a lower layer of the receiving device and that remain stored in a PDCP buffer without having been delivered to the upper layer.

10. The method according to claim 1, wherein the RX_DELIV state variable indicates a lowest COUNT value among COUNT values of PDCP SDUs that have not yet been delivered to the upper layer, and
    wherein the RX_NEXT state variable indicates a COUNT value of the next PDCP SDU expected to be received.

11. A receiving device configured to operate in a wireless communication system, the receiving device comprising:
    a Radio Frequency (RF) module;
    at least one processor; and
    at least one computer memory operably connectable to the at least one processor and storing instructions that, when executed by the at least one processor, perform operations comprising:
       determining that a Packet Data Convergence Protocol (PDCP) re-establishment has been triggered for re-establishment of a PDCP entity of the receiving device, wherein the PDCP entity is associated with an Unacknowledged mode (UM) Radio Link Control (RLC) entity of the receiving device; and
       based on the PDCP re-establishment being triggered:
          stopping and resetting a reordering timer that is associated with delivering PDCP Service Data Units (SDUs) to an upper layer of the receiving device;

delivering all stored PDCP SDUs to the upper layer in ascending order of COUNT values that are associated with the PDCP SDUs; and setting, by the PDCP entity, an RX_DELIV state variable and an RX_NEXT state variable of the PDCP entity to initial values, wherein the RX_DELIV state variable and the RX_NEXT state variable are receive state variables for the PDCP entity, wherein the RX_DELIV state variable is used to indicate a lower edge of a reordering window such that a first PDCP SDU not delivered to the upper layer can be identified, and wherein the RX_NEXT state variable is used to indicate a next PDCP SDU expected to be received.

12. The receiving device according to claim 11, wherein setting, by the PDCP entity, the RX_DELIV state variable and the RX_NEXT state variable to the initial values comprises setting the RX_DELIV state variable and the RX_NEXT state variable to values of 0.

13. The receiving device according to claim 12, wherein the operations further comprise:

setting, by the PDCP entity, the RX_DELIV state variable and the RX_NEXT state variable to the initial values during the PDCP re-establishment.

14. The receiving device according to claim 12, wherein the operations further comprise:

starting the reordering timer based on the PDCP entity receiving, from a lower layer of the receiving device, a PDCP Protocol Data Unit (PDU) with a COUNT value higher than a value of the RX_NEXT state variable.

15. The receiving device according to claim 11, wherein delivering the all stored PDCP SDUs to the upper layer comprises:

delivering the all stored PDCP SDUs to the upper layer after performing PDCP header decompression.

16. The receiving device according to claim 11, wherein determining that the PDCP re-establishment has been triggered comprises:

receiving, from the upper layer of the receiving device, a request for the PDCP re-establishment.

17. The receiving device according to claim 11, wherein stopping and resetting the reordering timer comprises:

stopping and resetting the reordering timer in a state in which the reordering timer is running.

18. The receiving device according to claim 11, wherein delivering the all stored PDCP SDUs to the upper layer comprises:

delivering the all stored PDCP SDUs to the upper layer based on stopping and resetting the reordering timer.

19. The receiving device according to claim 11, wherein delivering the all stored PDCP SDUs to the upper layer comprises:

delivering, to the upper layer, all PDCP SDUs that were received by the PDCP entity from a lower layer of the receiving device and that remain stored in a PDCP buffer without having been delivered to the upper layer.

20. The receiving device according to claim 11, wherein the RX_DELIV state variable indicates a lowest COUNT value among COUNT values of PDCP SDUs that have not yet been delivered to the upper layer, and wherein the RX_NEXT state variable indicates a COUNT value of the next PDCP SDU expected to be received.

* * * * *